(12) United States Patent
Hainfellner

(10) Patent No.: US 10,598,970 B2
(45) Date of Patent: Mar. 24, 2020

(54) DEVICE AND METHOD FOR REDUCING THE DAZZLE EFFECT IN A ROOM OF A BUILDING

(71) Applicant: AM7VISION GMBH, Münich (DE)

(72) Inventor: Martin Hainfellner, Münich (DE)

(73) Assignee: AM7VISION GMBH, Münich (DE)

( * ) Notice: Subject to any disclaimer, the term of this patent is extended or adjusted under 35 U.S.C. 154(b) by 208 days.

(21) Appl. No.: 15/518,633

(22) PCT Filed: Oct. 14, 2015

(86) PCT No.: PCT/EP2015/002024
§ 371 (c)(1),
(2) Date: Jul. 6, 2017

(87) PCT Pub. No.: WO2016/058695
PCT Pub. Date: Apr. 21, 2016

(65) Prior Publication Data
US 2017/0363897 A1   Dec. 21, 2017

(30) Foreign Application Priority Data

Oct. 14, 2014  (DE) .................. 10 2014 220 818

(51) Int. Cl.
*G02F 1/133*   (2006.01)
*E06B 9/24*   (2006.01)
(Continued)

(52) U.S. Cl.
CPC ........ *G02F 1/13318* (2013.01); *E06B 3/6722* (2013.01); *E06B 9/24* (2013.01);
(Continued)

(58) Field of Classification Search
CPC ..... E06B 2009/2405; E06B 2009/2417; E06B 2009/2464; E06B 3/6722; E06B 9/24;
(Continued)

(56) References Cited

U.S. PATENT DOCUMENTS

| 7,970,172 | B1 * | 6/2011 | Hendrickson ............... B60J 3/04 280/735 |
| 2009/0204291 | A1 * | 8/2009 | Cernasov ............... G02C 7/101 701/36 |

(Continued)

FOREIGN PATENT DOCUMENTS

| EP | 2583847 A1 * | 4/2013 | ............... B60J 3/04 |
| EP | 2583847 A1 | 4/2013 | |
| WO | 2014010498 A1 | 1/2014 | |

OTHER PUBLICATIONS

International Search Report for Application No. PCT/EP2015/002024, dated Feb. 29, 2016, 6 pages.

*Primary Examiner* — Thai Q Tran
*Assistant Examiner* — Stephen R Smith
(74) *Attorney, Agent, or Firm* — Zhong Law, LLC

(57) ABSTRACT

A device comprising a dimmable panel comprising a plurality of individually dimmable cells attached to a window glass, an optical sensor to detect an image of one or more objects, a computation unit, communicably coupled to the dimmable panel and the optical sensor, to: i) cause to darken one or more cells of the plurality of individual dimmable cells of the dimmable panel, ii) cause the optical sensor to capture an image of the one or more objects, and, iii) determine, based on the image, whether a shadow is cast on the one or more objects due to the one or more darkened cells.

8 Claims, 4 Drawing Sheets

(51) Int. Cl.
*G06K 9/00* (2006.01)
*G06T 7/73* (2017.01)
*E06B 3/67* (2006.01)
*F21S 11/00* (2006.01)
*F21V 14/00* (2018.01)
*G06K 9/46* (2006.01)

(52) U.S. Cl.
CPC ........... *F21S 11/007* (2013.01); *F21V 14/003* (2013.01); *G06K 9/00771* (2013.01); *G06T 7/73* (2017.01); *E06B 2009/2405* (2013.01); *E06B 2009/2417* (2013.01); *E06B 2009/2464* (2013.01); *G06K 9/4661* (2013.01); *G06T 2207/10152* (2013.01); *G06T 2207/20021* (2013.01); *G06T 2207/30196* (2013.01); *G06T 2207/30201* (2013.01); *Y02A 30/257* (2018.01); *Y02B 80/50* (2013.01)

(58) Field of Classification Search
CPC .. F21S 11/007; F21V 14/003; G02F 1/13318; G06K 9/00771; G06K 9/4661; G06T 2207/10152; G06T 2207/20021; G06T 2207/30196; G06T 2207/30201; G06T 7/73; Y02A 30/257; Y02B 80/50
USPC ....... 348/77; 349/14, 16; 296/97.2; 359/227, 359/238; 382/103; 345/207, 87; 701/36
See application file for complete search history.

(56) References Cited

U.S. PATENT DOCUMENTS

| | | | |
|---|---|---|---|
| 2013/0161971 A1* | 6/2013 | Bugno | B60J 3/04 296/97.2 |
| 2013/0271812 A1 | 10/2013 | Brown et al. | |
| 2014/0055831 A1* | 2/2014 | Johnson | E06B 9/24 359/238 |
| 2014/0085282 A1* | 3/2014 | Luebke | G06F 3/147 345/207 |
| 2014/0236323 A1 | 8/2014 | Brown et al. | |
| 2015/0191075 A1* | 7/2015 | Fueller | G06T 19/006 345/633 |
| 2015/0273989 A1* | 10/2015 | Momot | B60J 3/04 701/36 |

* cited by examiner

DEVICE AND METHOD FOR REDUCING THE DAZZLE EFFECT IN A ROOM OF A BUILDING

CROSS-REFERENCE TO RELATED APPLICATIONS

This application is a national stage application of PCT Application No. PCT/EP2015/002024 filed Oct. 14, 2015, which claims priority from German Patent Application No. DE 10 2014220818.1 filed Oct. 14, 2014.

TECHNICAL FIELD

This document relates to devices and methods for avoiding, lowering or reducing the glare effect in rooms by external light sources, in particular the sun and reflections of the sun, and the heat regulation of rooms.

BACKGROUND

The number of persons with an office workplace is steadily increasing. A large part of the workplace is exposed to the sun, which, besides desirable factors, may lead to undesirable glare effects. Distracting solar radiation can lead to a constant control of the shades and thus a frequent interruption of the working flow.

In general, glare situations can be annoying for persons in a room and can lead to a cutback in performance. For example, glare effect by a light source, such as the sun, can be annoying for a person reading, watching TV, working—especially when working on a desk and/or working on a computer-, eating, having a conversation with other persons or doing other activities.

In order to prevent light from falling through a transparent window on persons, in particular in the face, on the head or on the upper body of persons, which are in a room of a building, there are now some devices such as, for example, sun screens, sun blinds, blinds, dark adhesive films for transparent windows, electrically controlled shadeable windows and tinted windows.

Earlier devices have specific disadvantages, such as an unchangeable constant light damping, a complete darkening of the entire viewing area of a transparent window pane by coloring or tinting, or a complete optical suppression by the dimming means.

Darkening devices, such as blinds, cause the entire room to be darkened and not just the part that is relevant to the darkening. The contact to the outside is lost due to this darkening.

Often automatic blinds are raised in strong winds to prevent damage. For this reason, additional internal Venetian blinds are often used. The room heats up unnecessarily since the sun rays are blocked only after passing the window. In addition, the contact to the outside is lost.

Other darkening devices, such as electrochromic glazing, each darken an entire room, even when this is a disadvantage, for example during winter when warming by the sun is desired. Furthermore, electrochromic glazing has a considerable disadvantage with respect to the switching speeds; they switch very slowly. Furthermore, windows can only be darkened over a large area. For now, individual segments are not switchable, since switching signals with this technology would interfere with neighboring cells. A switching cycle takes up to 15 min. A selective fast darkening is thus not feasible.

Furthermore, darkening of the entire room (e.g. by blinds) can lead to a room-internal source of light, in particular for electric light, such as, for example, a light bulb, a fluorescent lamp, an uplight, a light-emitting diode lamp or an LED lamp or any other source of light, being switched on for better vision for the persons in the room, which would be avoidable with better use of the light from outside the building. Operating the indoor light source may require electrical power, which may involve costs.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
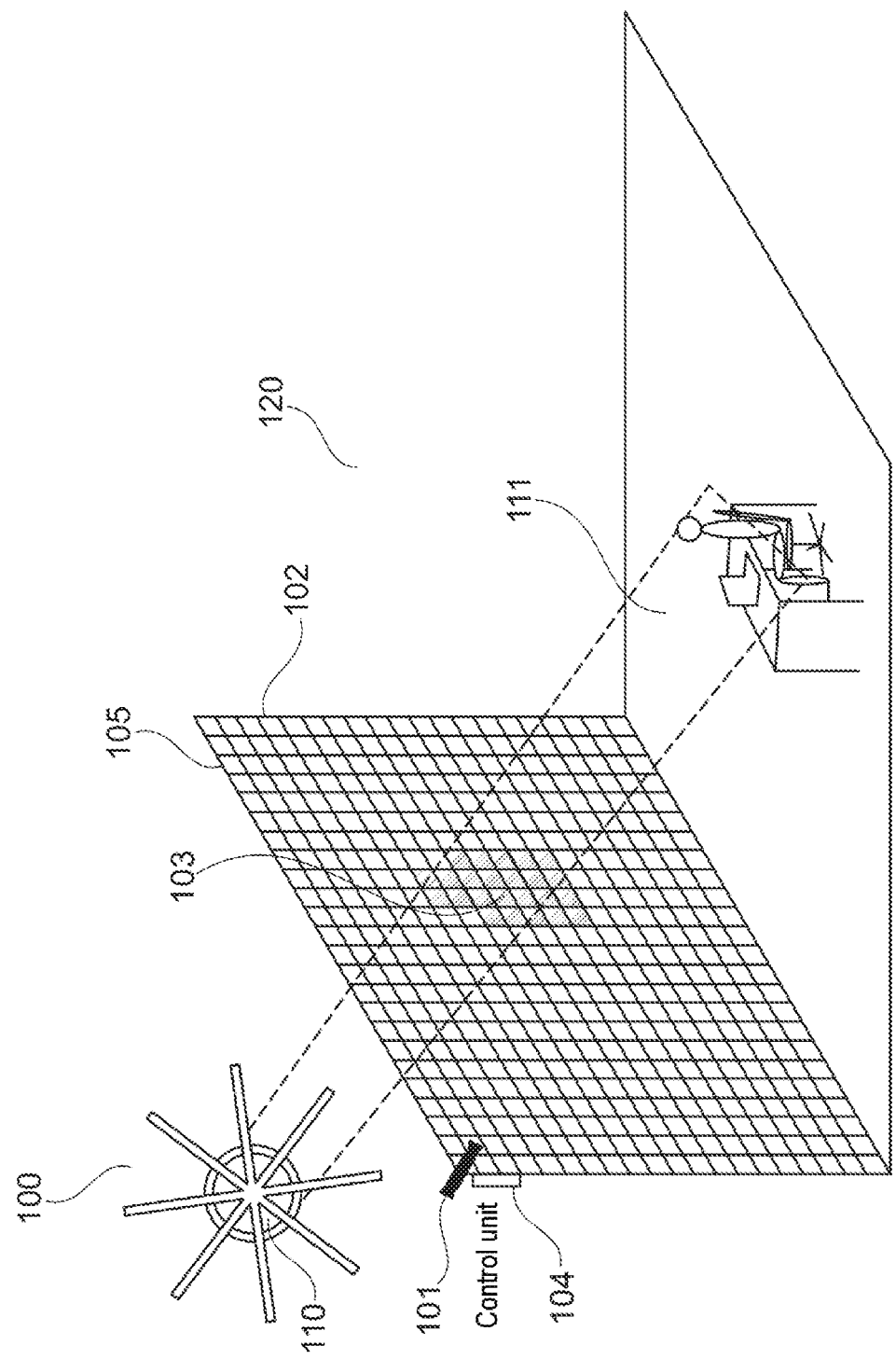
FIG. 1 shows a system for avoiding a glare effect according to an embodiment of the present disclosure.

The present document addresses the above disadvantages and describes systems and methods for avoiding the glare effect by strong external light sources while simultaneously using the external light sources to increase the general brightness in the room.

In addition, the room temperature in buildings can be well regulated by the present disclosure. In today's endeavors to avoid energy consumption, this system allows for simple heat regulation by suitable shading. In contrast to the slow switching techniques so far, it can be responded very quickly to changes of the solar radiation and the room temperature can be controlled ideally. This results in a considerable savings potential for room climate control.

The described systems and methods of the present disclosure can lead to increased comfort in the workplace and thus to an improved performance of the employees in a company. The described systems and methods use image analysis to calculate the position of persons in the room and thus to determine a suitable shadow position, and the control of a selectively dimmable panel which is attached to a window pane of a room.

The described systems are capable of variably darkening respective areas of a window pane of buildings dependent on external light sources at any desired distances and positions so that only a reduced portion of the incident light reaches the persons in a room. Special application situations are sunny days with direct insulation into a room. A further application situation for the described devices is glare effects caused by reflections of the sun from other buildings, which leads to glare effect of the persons in a room. In such cases of glare, the described systems search, based on an electronic-optical feedback structure, the area(s) on the window pane between the detected persons in a room and the external light sources to be darkened, so that the area(s) can be selectively darkened to avoid or reduce a glare effect situation. The degree of darkening typically ensures that the glaring source of light (e.g. the sun) is dampened to such an extent that pleasant working is possible also at a screen workplace, while the remaining area of the window pane or the window panes remains completely transparent for view. The result of the selective darkening is not only the protection of the persons at the workplace from glare effect, but also a natural increase of the working ergonomics (by avoiding the complete darkening of the entire room). This means that the persons in a room have the opportunity not to lose contact with the outside, which increases quality of life.

According to one aspect of this document, a device for reducing the glare effect of a light source for persons in a room of a building is described.

The room can be, for example, an office space, a meeting room, a secondary room, a hallway, a school room, a lecture hall, a study room, a living room or any other room. The light source is, for example, the sun or reflected sunlight from other buildings. It should be noted that the device may be adapted to darken a plurality of glaring light sources (e.g. a plurality of reflections) and the darkening may be performed for a plurality of persons in a room.

The building can be an office building, a school building, a university building, a library, a museum building, a department store, a private house (such as a single-family house, a multi-family house, a terraced house, a town house, a tenement house or any other private house), a tower, in particular a control tower, or any other building.

The person to be protected from glare can, for example, work at a desk or stand in the room talking to another person or move around in the room. Further, there may also be several persons in the room. It is also possible to protect the several persons from glare effect by the light sources.

The at least one light source can be an external light source, for example the sun or reflections of the sun, e.g. on a lake or a glass front of another building.

According to the present aspect of this document, the device comprises a dimmable panel, an optical sensor and a computation unit.

The dimmable panel has a plurality of individually dimmable cells. The individual cells of the dimmable panel can be arranged in a matrix form, so that a matrix of N rows and M columns is created.

The dimmable panel may, for example, comprise a LCD layer (or a LCD film), which darkens when an electrical voltage is applied. In particular, each of the plurality of cells may comprise a LCD layer so that each cell can be darkened separately by applying a voltage. Typically, a transparency of the dimmable panel (i.e., the individual cells) is variable. For example, by varying the applied voltage, the degree of transparency or the degree of darkening of the individual cells can be varied. The panel is generally positioned between a position for the persons in a room and the light source. In other words, the panel is typically arranged within the light beam of the light source in front of a position for the persons in a room so as to be able to darken the light beam and thus to reduce a glare effect for the persons in a room by the light source. Typically, the dimmable panel is attached to a glass pane (e.g. a window pane of a building). The LCD layer may be attached (e.g. glued) to the glass pane. However, the LCD layer may also be inserted between a plurality of glass layers of a glass pane (for example, in the case of a double window glass). The LCD layer may be glued as a LCD film with the window panes, e.g. between two glass layers. A plurality of windows with respective dimmable panels with a respective plurality of individually dimmable cells may be coupled to form a darkening structure.

The device comprises an optical sensor (e.g. a camera) adapted to detect an image of the persons in a room. In other words, the optical sensor(s) are positioned in a room for detection of the persons in such a way that, if possible, all persons in a room can be detected. The optical sensor may comprise one or more cameras. In particular, in large rooms, a plurality of cameras facilitates the detection of all persons in the room. In one embodiment, the optical sensor is directed at a horizontal angle of 20° to 60° into the area which is relevant for determining the position data. For example, the optical sensor could be attached to a corner to the ceiling. Additionally or alternatively, an optical sensor may also be attached to a lateral position of the room (on a wall).

The device further comprises a computation unit configured to control the plurality of cells of the dimmable panel based on the image sensed by the optical sensor such that a shadow is cast on the persons in the room. In particular, the computation unit can be configured to determine one or more shadow cells from the plurality of cells, which cause a shadow to be cast on the persons in the room when the one or more shadow cells are darkened when illuminated by the light source. At the same time, the one or more shadow cells are determined to include only the cells required to generate the shadow on the person and the devices associated with the person (e.g. the workstation). All other cells in the panel should remain transparent to maintain contact with the outside area. To determine the appropriate shadow cells, the computation unit can be configured to perform the methods described in this document for reducing the glare effect by a light source. In particular, the computation unit can be configured to perform the search phases and darkening phases described below using the optical sensor and the dimmable panel.

According to a further aspect of this document, a device for reducing a glare effect of at least one light source to one or more persons in a room of a building is described, the device comprising a dimmable panel, a first optical sensor, a second optical sensor, and a computation unit. The computation unit is coupled to the dimmable panel, the first optical sensor and the second optical sensor. The dimmable panel comprises a plurality of individually dimmable cells, wherein the panel is attached to a window glass of the building. The first optical sensor is adapted to detect a first image of the one or more persons in the room. The second optical sensor is configured to detect a second image of at least one light source.

The computation unit is further configured to cause the first optical sensor to capture the first image of the one or more persons in the room, to identify the respective position of the one or more persons based on the first image, to cause the second optical sensor to capture the second image of the at least one light source, to identify the position of the at least one light source based on the second image, and to darken one or several cells of the plurality of individual dimmable cells based on the position of the one or more persons in the room and the position of the at least one light source.

The dimmable panel may be the same as the above-described dimmable panel. The above-described optical sensor can be provided as the first optical sensor.

The second optical sensor can be almost the same as the above-described optical sensor. Thus, the second optical sensor may also comprise one or more cameras. However, this optical sensor is configured to detect an image of the at least one light source. It is therefore preferably directed outwards. It can be positioned within the room or outside the room. Furthermore, the sensor is preferably adapted to the expected brightness of the light source.

According to a further aspect of this document, a method for reducing the glare effect of a light source to the persons in a room is described. The method comprises darkening an area (e.g. of one or more cells) of the dimmable panel. As set forth above, the panel is typically positioned between the persons in a room and the light source (e.g. at a window pane of a building). Furthermore, the method comprises detecting an image of the persons in a room (e.g. by means of one or more optical sensors directed at the persons in a room). In particular, an image of the heads of the persons can be detected. Finally, it is determined based on the image whether a shadow is cast on the persons due to the darkened panel. These steps of the method can be iterated for different areas of the panel so as to determine one or more subareas of the panel which, in the darkened state, cast a shadow on the persons in a room.

As already stated above, the dimmable panel may comprise a cell matrix having a plurality of separately dimmable cells, i.e. the darkened portion of the panel may correspond to one or more of the cells. The darkening of a portion of the dimmable panel may then comprise darkening one or more cells of the plurality of cells.

Typically, the method comprises a search phase. In the search phase, one or more shadow cells of the plurality of cells are determined. The one or more shadow cells have the characteristic that by their darkening a shadow is cast from the light source (i.e., when illuminated from the light source) to the persons in the room. Determining the one or more shadow cells comprises generally iterating the steps of darkening (a portion of the panels), detecting (an image with the partially darkened panel) and determining (the presence of a shadow on the persons in the room) for different areas or cells of the panel. In other words, by iterating the above steps for each of the plurality of cells of the panel, it is determined by which of the cells a shadow is cast on the persons in room so as to reduce the glare effect by the light source.

The search for the one or more shadow cells can use specific search algorithms that reduce the search time. For a panel of M×N cells, these search algorithms require generally less than M×N iterations. For example, in one iteration, a subarea of several cells in the panel can be darkened (for example, a row or a column or a half of the panel). In the following iteration, the subarea can be excluded from the determination of one or more shadow cells, if it is determined that by the darkened subarea no shadow (when illuminated by the light source) is cast on the persons in a room. On the other hand, in the following iteration, the determination of one or more shadow cells can be restricted to the subarea when it is determined that a shadow is cast on the persons in a room.

In addition to the search phase, the method typically includes a darkening phase during which the one or more shadow cells are continuously darkened so as to reduce the glare effect of the light source to the persons in a room.

To continuously adapt the determined shadow cells to a movement of the light source, the search phase (and thus the determination of the shadow cells) and the darkening phase (and thus the continuous darkening of the shadow cells) can be cyclically repeated. A suitable cycle frequency is, for example, 5 Hz, 6 Hz, 7 Hz, 8 Hz, 9 Hz, 10 Hz or more. In order to achieve an effective reduction of the glare effect, the darkening phase typically includes 80%, 85%, 90% or more of the total time of one cycle.

The time of the search phase can generally be reduced if the one or more shadow cells from one or more preceding cycles are used in determining the one or more shadow cells in a particular cycle. Due to the continuous movement of the light source, one or more shadow cells can be predicted from a sequence of cycles (for example by means of motion estimation methods). In other words, the one or more shadow cells for the particular cycle can be predicted from the one or more shadow cells from the one or more preceding cycles.

As set forth above, the method can be adapted to reduce the glare effect of a plurality of light sources. In particular, the method can determine that the one or more shadow cells comprise a plurality of shadow cells forming a plurality of subareas of the panel. In other words, it can be determined that the determined shadow cells form groups or clusters, each of these clusters (subareas) can be assigned to a corresponding light source from a plurality of light sources. That is, by detecting clusters, the method detects the presence of a plurality of light sources darkened by one of the cell clusters, respectively. The method can then handle each of said clusters (or subareas) separately. In particular, changes for the clusters can be determined separately so that each subarea (cluster) can be predicted from a corresponding subarea of a preceding cycle.

The method can also comprise steps for detecting a situation with glare effect. These steps can be performed, for example, within each cycle between the search phase and the darkening phase. For this purpose, the method can determine an overall image comprising one or more persons in a room and the surroundings of the persons. The overall image is typically determined with a fully transparent (i.e., turned-off) panel. An area of the persons in a room can be determined from the overall image. Based on this information, a total brightness can be determined from the brightness of the overall image (e.g., the average brightness of the overall image) and a facial brightness from the brightness of the overall image in the area of the face (e.g., the average brightness in the facial area). Finally, a glare effect on the persons in a room (or the possibility of a glare effect on the persons in a room) can be detected by the light source based on the facial brightness and the total brightness. For example, a ratio between facial brightness and total brightness can be determined. A glare situation is detected if the ratio is above a predetermined threshold value.

For shortening the search phase, it is usually advantageous if an image of the persons in the room during the search phase is determined only in the area of the face. The area of the face can be determined from the overall image using pattern recognition methods. Due to this situation, in a subsequent search phase, the detection of the image of the persons in the room can be limited to the area of the face. A color histogram can be used for evaluation. A facial brightness can also be determined from the overall image, for example, as brightness of the overall image in the area of the face (e.g. as the average brightness in the area of the face in the color histogram). In other words, a degree of glare by the light source can be detected. Accordingly, a degree of darkening of the one or more shadow cells can be determined based on the determined facial brightness.

It should be noted that the various methods and devices may be used alone and in combination with each other. In particular, all the features described in this document may be combined with one another in any manner. This applies in particular to the features set out in the claims.

FIG. 1 shows, by way of example, a device 100 for reducing the glare effect of external light sources 110. FIG. 1 shows this device 100, by way of example, with an office room 120. It is noted, however, that the device can be applied in any room 100 in which one or more persons in the room may be annoyed, e.g., through a window pane 105, by one or more light sources 110 (such as, for example, office rooms, corridors, rooms, etc.).

The device 100 comprises a selectively dimmable panel 102, which is capable of darkening one or more selective areas 103 of the viewing area of the persons in a room. In addition, the device 100 comprises an optical sensor 101 (e.g. a camera) that detects the persons (i.e., in particular the area of the face of the persons) in a room. For this purpose, the optical sensor 101 is arranged in front of the person (in the viewing direction of the persons) (i.e., between the persons in the room and the glaring light source 110).

Further, the device 100 comprises a computation unit 104 which is capable of performing a method for reducing the glare effect of the external light source(s) 110. For this purpose, the computation unit 104 evaluates the optical signals (e.g. the images) of the optical sensor 101 to detect a glare situation of the persons in the room. Further, the computation unit 104 controls the panel 102 and the optical sensor 101 to selectively darken the panel 102 in an iterative process so that a darkening shadow 111 is cast on the person, with the darkening shadow 111 reducing or eliminating the glare situation of the person. In the case of several light sources 110 from different directions, several darkening shadows 111 are cast on the faces of the persons. This plurality of shadows 111 is created by a corresponding plurality of darkened areas 103 of the panel 102. The selective darkening of the panel 102 is such that the viewing area outside the interfering light source(s) 110 remains unaffected. Preferably, the computation unit also recognizes individual work devices, such as a computer screen, and selects the cells to be darkened in such a way that the darkened cells also cast the shadow on the work device.

System 100 may be based on methods of the optically augmented reality (Augmented Reality) with a new perspective: instead of positioning computer-based projections at a certain distance, as usual in augmented reality, the system 100 darkens certain areas of the window pane 105 by means of special algorithms and observes, in the context of a feedback structure, the produced shadows 111 on the faces of the persons in a room by means of an optical sensor 101 (e.g. a camera or a plurality of directional light sensors) to determine the position of the shadows and the contrasts in the room, i.e. in particular on the face of the persons in room. The feedback structure, which comprises the optical sensor 101, the panel 102 and the processing unit 104, allows (typically within a few milliseconds) by means of the panel 102 to generate different darkening patterns on the window pane 105 (by sequential or heuristic darkening of certain areas/cells 103 of the panel 102) and at the same time to determine and analyze the brightness of the person's facial area by means of the optical sensor 101 (in real-time). By means of suitable search methods, the number and the positions of the areas 103 to be darkened are calculated by the computation unit 104 for optimum protection of the person. Thus, without knowing the position, the direction and the distance of the external light source(s) 110 in advance, the device 100 provides for determination of the locations 103 to be darkened on the window pane 105 to achieve an optimum shadowing of the face.

Technically, the system 100 is based on a single optical sensor (e.g., a video camera) 101 for shadow analysis. As output, the system 100 uses a selectively dimmable film 102 for shadow generation. The system 100 is self-adjusting and thus does not (or barely) require calibration. In particular, the system 100 does not require sensors for position detection of the external light source(s) (110). Based on a fast image analysis, the optimum darkening can be calculated in a very brief time.

The described system 100 therefore has a high efficiency and a simple integration. The described system 100 makes it possible to significantly increase the performance of persons, in particular at an office workplace. The system 100 is capable of selectively darkening bright light effects without compromising the view of other areas of the surroundings. On the contrary: through the suppression of the glare effect the important contact with the outside area is maintained. Furthermore, the system 100 makes it possible to make better use of the outside light inside the room, thus avoiding the switching-on of light sources within the room.

A standard video camera may be used as optical sensor 101, for example. Such cameras can produce, for example, 50 images per second at a resolution of 1920×1080 pixels. This sequence of images can then, for example in real-time, be transmitted to the computation unit 104 via a Gb Ethernet interface.

The optical sensor 101 is directed to the persons in the room (i.e., in particular, to the facial area). The precise position of the optical sensor 101 should be chosen inter alia according to practical aspects, so that it can be easily installed in a building and the room optic is not impaired. Above all, however, the position of the optical sensor 101 should be selected such that the optical sensor 101 can completely detect the entire room and, in particular, the area of the desk and the conference area. The movement radius and/or the different sizes of different persons can also be considered. Finally, the selected position should allow to reliably detect brightness contrasts on the face of the persons in the room to be able to reliably determine glare effects and the position of the shadow 111. It has been shown that the above-mentioned requirements can be achieved with the positioning of the sensor 101 oblique laterally on the upper edge of a window front, for example at an angle of 20°-60° to a front line. For example, the sensor 101 could be installed in a room, for example, near the window front center, as shown by way of example in FIG. 1.

For the above-described feedback mechanism for determining the darkening areas 103 of the panel 102, a standard frame rate of (50-60 Hz) is typically required. The frame rate can be achieved, for example, by using suitable room monitoring cameras. As already stated above, it is typically sufficient for the reduction of the glare effect according to the method and system described herein when a glare situation is detected in the facial area of the persons in a room and then the generation of a shadow 111 in the facial area and below by the selectively dimmable panel 102 is detected. The frame rate of the sensor 101 can therefore be increased by reducing the read-out area of the sensor 101 to a subarea (ROI—Region Of Interest) of the entire detection area of the sensor 101, wherein the selected subarea (ROI) depends on the determined facial area of the persons in the room. Typically, the ROI is defined by the determined facial area, including a defined surrounding (e.g. a margin of a given number of pixels around the facial area).

To enable an increase of the frame rate by restricting the image detection to a subarea (ROI), in one embodiment the image processing is divided into two steps in time. In a first step, a full image detection is performed to diagnose a glare situation and to recognize the face or the head position. In this step, the ROI is determined. This first step could, for example, be carried out with a frequency of 10 Hz (see reference number 313 in FIG. 4). In a second step, the iterative determination of the locations 103 to be darkened of the panel 102 is then carried out (see reference number 301 in FIG. 4). Said iterative determination of the locations 103 to be darkened should be carried out in such a brief time that the persons in a room are not irritated, and (2) the desired shadow 111 is cast on the person so quickly that no noticeable disturbance occurs due to the initial glare situation. To accelerate the iterative determination process, a frame rate as high as possible is desirable, which can be increased by limiting the image detection to the ROI in the second step. By limiting the image detection to the ROI, frame rates of over 100 Hz and higher are possible so that the iterative determination process can meet the above requirements.

It should also be noted that the possible frame rate of the optical sensor 101 is typically also dependent on the lighting condition. Poor lighting conditions (e.g. in the morning and in the evening) usually require higher exposure times and consequently a lower frame rate. Dynamic adjustment of the frame rate is typically not possible. For this reason, the computation unit 104 can be configured such that the clocking of the reading of the optical sensor 101 is adapted to the respective required exposure times of the optical sensor 101.

Figure 2:
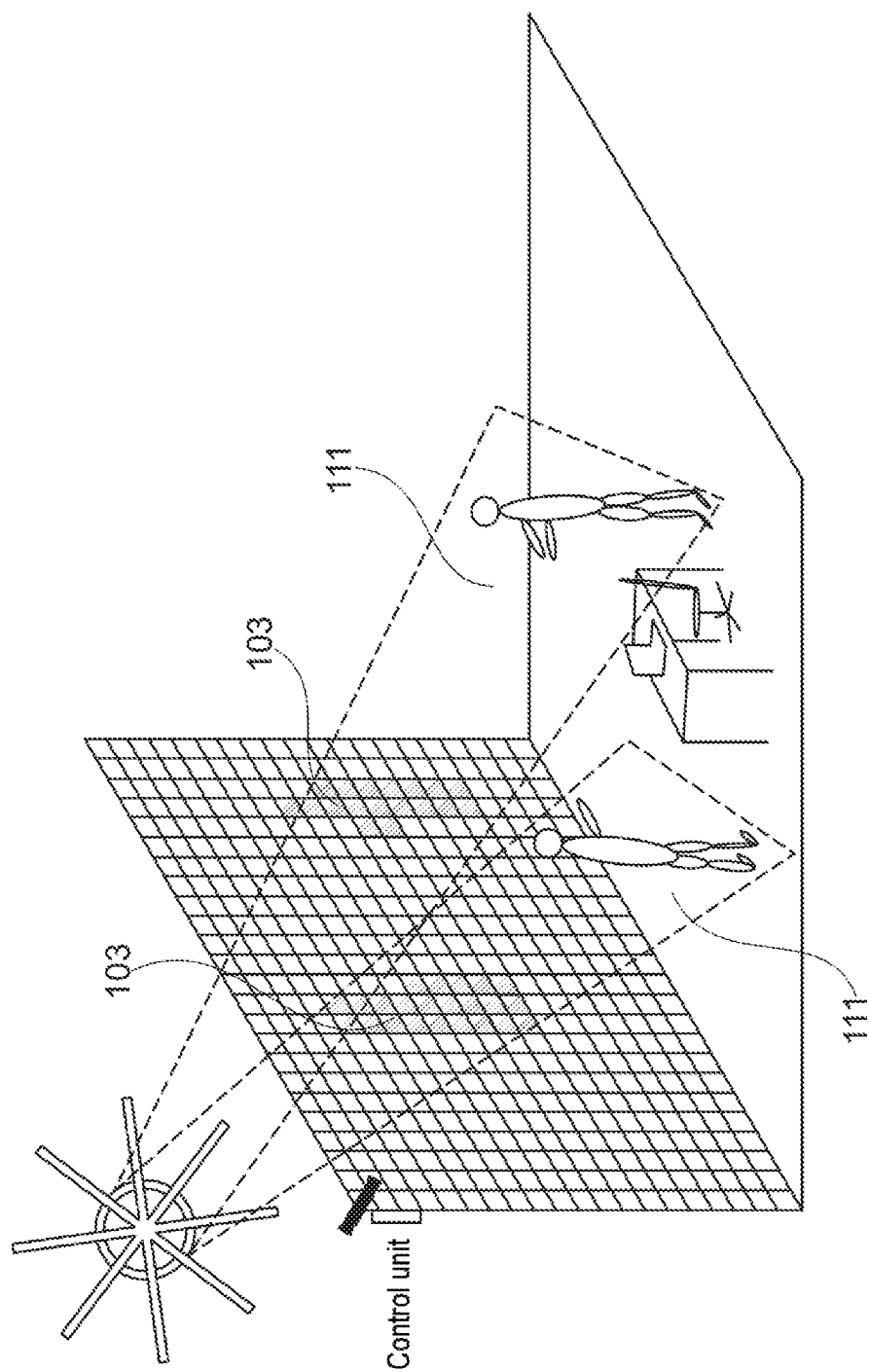
FIG. 2 shows a system for avoiding a glare effect according to an embodiment of the present disclosure.

FIG. 2 shows, by way of example, a further exemplary system for avoiding a glare effect. In FIG. 2, two persons are in a room. As can be seen from FIG. 2, for each of the two persons, an area of the dimmable panel is darkened so that these areas cast a shadow on the respective persons.

Figure 3:
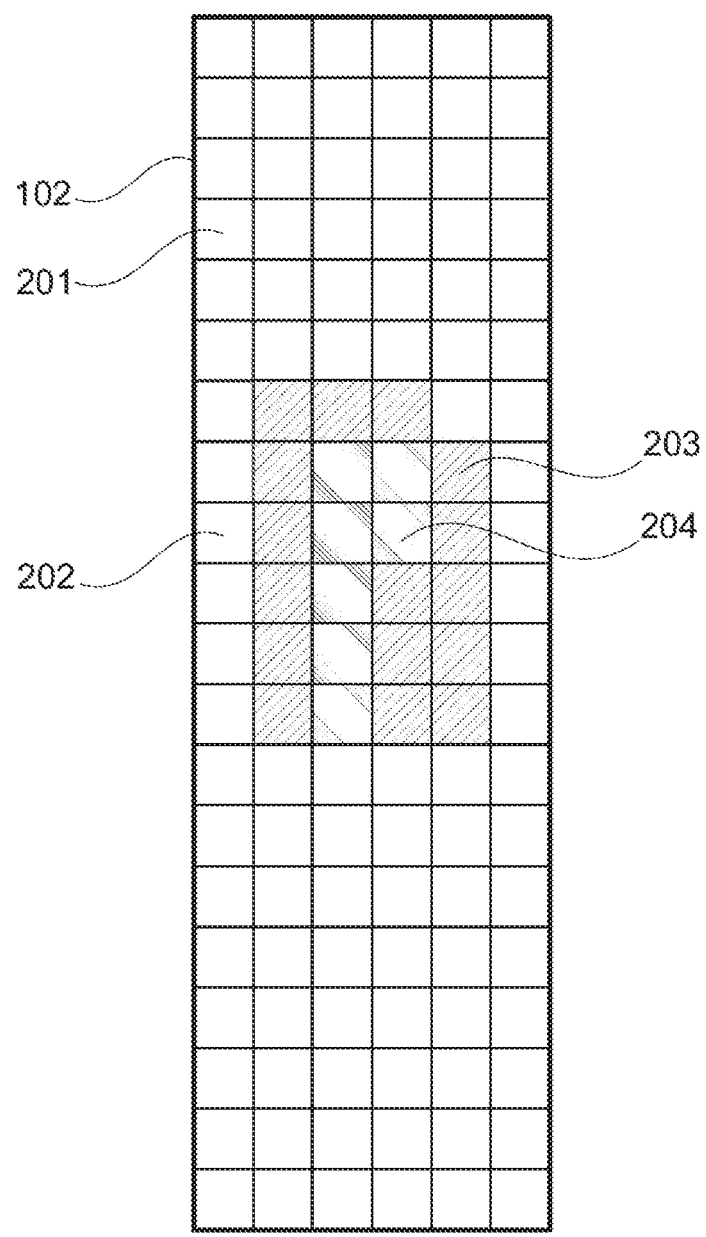
FIG. 3 shows a dimmable panel according to an embodiment of the present disclosure.

FIG. 3 shows the exemplary structure of a selectively dimmable panel 102. The panel 102 shown in FIG. 3 comprises dimmable individual cells 201 in a matrix form. Each dimmable individual cell 201 could comprise a LCD layer which darkens the cell 201 when an electrical voltage is applied. The individual cells 201 are typically configured such that they have a transparency of 70%, 80%, 90% or more in the inactive (transparent) state. In the active (darkening) state, the transparency could be reduced up to 1% (or even 0.1%). The degree of transparency can typically be controlled by the magnitude of the applied voltage. Thus, different degrees of darkening of the cells 201 can be achieved, as illustrated by the cells 202, 203, 204 in FIG. 3.

The panel 102 shown in FIG. 3 is composed of a plurality of individual cells 201 in the form of a matrix, wherein each individual cell 201 can be separately darkened. By way of example, a cell 201 of the panel 102 could be constructed in the size 100×100 mm to cover the relevant viewing area on the window pane 105 of an office room 120. For this purpose, 120 cells 201 could be used in a configuration of 6 columns and 20 rows. Of course, other cell sizes and panel sizes may also be used.

The individual cells 201 can be differently darkened by the application of a current signal. Transparent lines can be used to guide the current signal to the individual cells 201. The electrical terminal of the panel 102 can be laterally attached to the panel 102. The dimmable cells 201 of the panel 102 are configured such that they enable a virtually immediate change from the transparent to the darkened state (and vice versa). Existing LCD layers can be darkened in the range of 0.1 ms, so that state changes with a frequency of 10.000 Hz are possible.

During the iterative process for determining the cells 201 to be darkened, certain cells 201 of the panel 102 are darkened and at the same time the optical sensor 101 determines whether a shadow 111 is generated in the facial area or head area (ROI) of the persons in a room. To enable this, the computation unit 104 is capable of synchronizing the darkening of one or more cells 201 (by applying a voltage to the respective cells 201) and the determining an image (by reading out the optical sensor 101). As shown above, with today's cameras 101, frame rates of 100 Hz and higher are possible and panels 102 can be operated with a darkening rate of approximately 10.000 Hz. Thus, it is already possible to evaluate possible darkening patterns at a frequency of 100 Hz (or more) on the shadow 111 cast by this pattern, so as to determine, in an iterative process, a darkening pattern of the panel 102 (i.e., a panel configuration) which reduces the glare effect of light source(s) 110. The following is an example of a frequency of 100 Hz.

The panel 102 typically comprises a control unit, based on which (e.g. based on encoded telegrams) the states of all cells 201 (e.g. LCD films) on the panel 102 can be controlled. The control unit can be implemented as an electronic circuit board which issues, with a corresponding telegram coding, a serial signal for a series of 120 independent AC signals (for the 120 cells 201 of the panel 102), which are used for driving the individual cells 201. During the search for a pattern (a pattern includes the values for all 120 cells 201 of the panel 102) which casts a suitable shadow 111 (or more suitable shadows), a list of patterns (along with the clock frequency) may be sent from the computation unit 104 to the control unit, which then controls a different darkening configuration of the panel 102 according to the predetermined patterns (e.g. with a frequency of 100 Hz). In addition, the control unit of the panel 102 can output a sync signal which serves to synchronize the recording by the video camera 101.

It should be noted that for the synchronization between the individual components of the system 100 (in particular the sensor 101 and the panel 102), respective delays should be taken into account. Typically, there are a number of processes and transmissions of signals that introduce a delay through digital processing. These are, inter alia, the transmission of the serial signal of the computation unit 104, the processing of the signal by means of the control unit of the panel 102, the reaction time for darkening of the LCD cells 201 (0.1-0.2 ms). These delays should be considered in generating the sync signal for the optical sensor 101 to ensure that the shadow image detected by the sensor 101 was generated by a particular panel pattern (rather than by a mixture of two consecutive patterns), i.e. that the image capturing by the sensor 101 and the shadowing by the panel 102 are synchronized.

Figure 4:
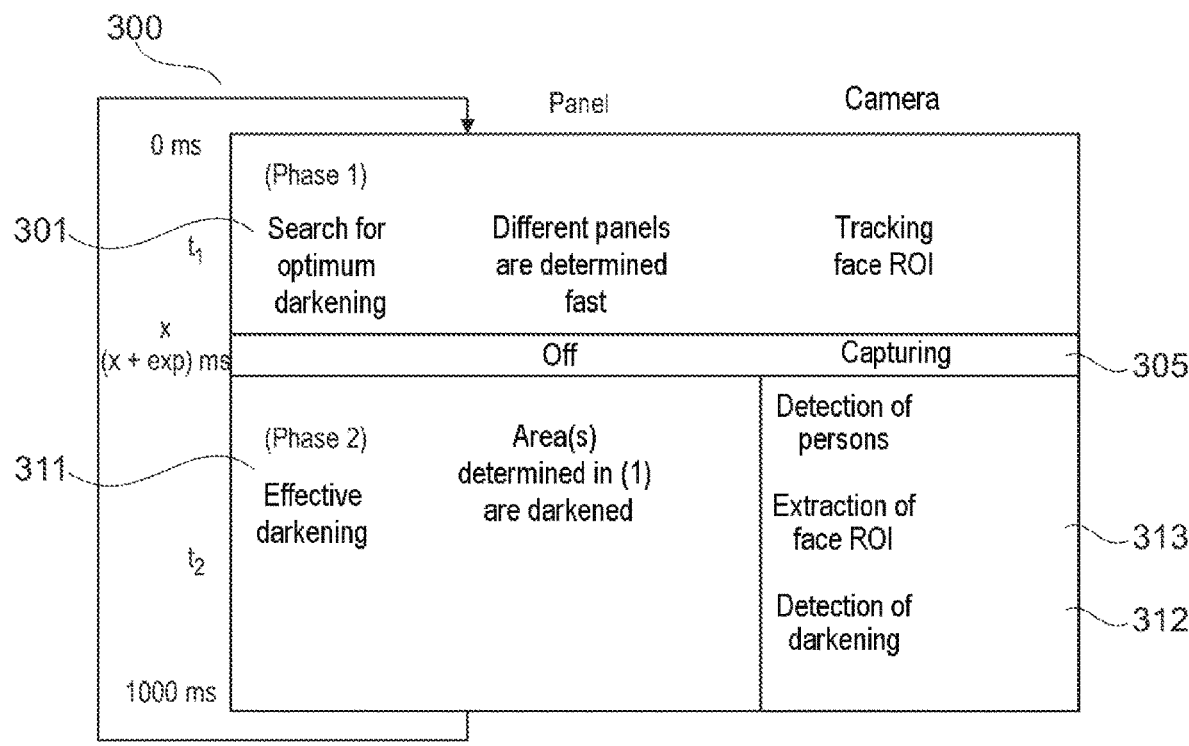
FIG. 4 describes an exemplary method for avoiding/reducing a glare effect according to an embodiment of the present disclosure.

FIG. 4 shows an exemplary iterative method 300 for reducing the glare effect of external light sources 110 by means of the device 100. The method 300 comprises two phases. In a first (short) phase 301, a panel pattern (also called panel configuration) is determined, which optimally reduces the glare situation of the persons in the room. In a second (long) phase 311, the panel configuration determined in the first phase 301 is applied to allow a continuous reduction of the glare situation of the persons in a room. Since both the position of the glaring light source 110, as well as the position of the persons in a room 120, as well as the position of the head can change continuously with the sun's course and the passing clouds, the two phases 301, 311 of the iterative method 300 are cyclically repeated (e.g. every 100 ms), to adjust the optimal panel configuration continuously to the new glare situation. This is shown in FIG. 4 by the feedback loop between the second phase 311 and the first phase 301.

In other words, to allow for efficient darkening, in method 300 two phases are defined in the functionality of the system 100, which are cycled at a frequency of 10 Hz. In the first phase 301 of the cycle of 100 ms, a suitable target location of the darkening is searched for with different patterns. In the second phase 311, the identified location of the panel 102 is darkened to the desired degree of transparency until the end of the current cycle (that is to the end of the 100 ms) to protect the viewpoint of the person. Between these phases, a full image can be taken (reference number 305), while the panel 102 is deactivated briefly (e.g. for an exposure time of 1 ms during daytime). As mentioned above, the full image can be used to determine the presence of a glare situation (for detecting the glare effect) (reference number 312) and/or to determine the position of the persons in a room (and to extract the head position (ROI) in the image) (reference number 313). The processing required can occur during the second phase 311, so that no delays occur in the determination of a suitable panel configuration (for which the ROI is typically used).

In the first phase 301 the areas of the panel are identified by means of different strategies and based on the image analysis, which lead to a notable darkening of the head/face area of persons in a room. The search for a suitable panel configuration typically considers the panel configuration used by the one or more preceding cycles to quickly determine the currently appropriate panel configuration, assuming a continuous situation. For this purpose, for example, motion estimation methods known from image processing can be used to continuously adjust the panel configuration with varying brightness changes of the light sources 110, e.g. due to clouds and/or the movement of persons through a room. However, if a glare effect occurs for the first time without knowing which direction the light source 110 is coming from, the search for a suitable panel configuration is typically more complex since no suitable panel configurations from the past can be used.

A glare situation, where a single source (e.g. the sun) typically causes the glare, is to be distinguished from the glare situation during reflections of the sun through other buildings in which multiple light sources can often cause glare at the same time. Consequently, it may be advantageous to use a customized search strategy to determine the suitable panel configuration depending on the situation.

In a sequential method, all 120 cells 201 can be darkened sequentially, and it can be examined if there are any effects in the area of the face. In a purely sequential search at 50 Hz, a cell 201 is darkened up to 20 milliseconds per cycle. In this case, the search phase would take 2400 ms, which means that an effective darkening (in the second phase 311) only takes place for approximately 50% of the entire cycle time since the rest of the cycle time is used for the search for a suitable panel configuration (in the first phase 301).

If the sun (or a single light source 110) has a glare effect on the persons in the room (situation without reflection) and only one area (comprising one or more of the 120 cells 201 per window) of the panel 102 should be darkened, the following row-column search method could be used. In the row-column search, first the complete (20) rows and then the complete (six) columns of the panel 102 are darkened and the shadowing in the ROI is determined for each row/column. If a shadow is determined in the ROI for a particular row and for a particular column, the cell 201 to be darkened is obtained by the combination of the row number and the column number. With this method, 26 search steps (i.e., a time of 520 ms at 50 Hz) per window pane are required. Generally, by this method, the search time can be reduced by a factor (N+M)/N*M*number of window panes (for a panel 102 having N rows and M columns).

As a further search method, the "divide et impera" method can be used. In this method, the search area is divided into two halves. The two halves of the search area are darkened one by one, and it is examined in which of the two halves the desired shadow 111 is cast on the ROI. This half then represents the new search area, and the method continues with a new iteration (based on the new search area). Thus, the search area is respectively reduced by one half in several iterations, so that in a N×M panel 102 a cell 201 to be darkened can be identified in each window pane in $\sqrt{NM}$ steps. In each iteration, half of the search area is set as the new search area that casts a shadow 111 on the ROI. The identification of the target position of the darkening thus requires approximately 8-11 iterations steps (in a panel of 120 cells), i.e., 16-20 images of the ROI are required, which at 50 Hz can be carried out in a time of max. 1000 ms per window pane.

Generally, the search time can be further reduced if one or more panel configurations from preceding cycles can be used, i.e. when previously identified panel configurations are considered during the search. This will be explained in more detail below.

In the above examples, a cycle time of 100 ms and a frame rate of 50 to 100 Hz was used. To reduce the portion of the first phase 301 (i.e. the search phase) of the total cycle, it could be advantageous to increase the cycle time, i.e. to reduce the main cycle frequency (e.g. from 10 Hz to 8 Hz, so that a cycle time of 125 ms results). This can reduce the portion of the search phase of the total cycle to 8% for a search time of 10 ms.

The above search methods can be adapted for the search for several light sources. In particular, this can be necessary for reflections of the sun through other buildings.

As mentioned above, the panel configurations from preceding cycles can be used for the search for a current panel configuration. For example, the search of the current panel configurations (i.e., the current darkening areas) can be performed in the immediate vicinity of the darkening areas already detected in the preceding cycle. The cyclically determined reference images (full image, without darkening) can also be used to determine the current darkening areas. As a result, detected light/shadow movements can be detected and movement parameters can be determined, which are considered in the search for darkening areas. Each determined darkening area can be compared with the corresponding reference image in each cycle. In addition to movement information, it is thus also possible to determine whether a particular light source is still present. If, for example, the comparison between the image with darkening and the reference image shows no difference, the specific light source can be classified as "no longer present". In an exemplary method, the search can be reduced to 2% of the cycle time by considering the reference image.

As already explained, a current panel configuration is to be determined in each cycle as quickly as possible. For light sources 110, which were already present in a preceding cycle, the corresponding darkening areas from the preceding cycles can be used. In particular, relative movement tendencies of the light sources can be determined. For this purpose, the 3D angular speed of the individual light sources can be determined. In addition, the directions of the light sources relative to the head position can be determined. The two angles (horizontal and vertical) of each light source 110 with respect to the main axis are calculated based on the geometry of the panel 102, the camera position 101 and the position of the head (ROI).

By analyzing a sequence of darkening areas, a sequence of associated shadow images, and/or a sequence of reference images for a sequence of cycles, a movement of the shadow 111 can be detected on the person's face, resulting in a movement of the corresponding light source 110. This movement of the shadow can be carried out by determining the light variation within the images (e.g. when the brightness increases in the area of the head). The determined movement of the shadow 111 can be compensated for by adjustment/expansion of the darkened cells 201 of the panel 102 so that the darkening area is tracked to the movement of the light source 110. That is, after detection of the direction of movement of the light sources 110, the position of the areas to be darkened can be predicted (e.g. using a Kalman estimator). A simplified, three-dimensional image of the room can be made by calibrating the dimmable panel 102 and the camera 101. By determining the head positions, the transformation between the head position and the panel is estimated. By prediction of the darkening areas, the search for optimum darkening areas can be skipped for the light source 110 already present, which leads to a significant reduction of the search time in the first phase 301.

A further aspect of the system 100 is the dynamic adjustment of the light transmittance of the darkened areas 201 of the panel 102. In other words, the system 100 is capable of differently darkening light sources 110 with varying glare effects. For this purpose, in addition to the association of the light source 110 with a position of the shadow 111 on the detected reference image, an estimation of the brightness of the respective light source 110 is also required. By correctly estimating the brightness of a light source 110, the intensity of the darkening can be determined dynamically.

In the realization of this function, several factors are typically considered. On the one hand, the current exposure time of the camera 101 is considered, wherein the exposure time determines the brightness of the head ROI. As already explained, the exposure time can be determined using a look-up table (e.g. based on the brightness of the environment) and applied to the camera. A second influencing variable is the degree of darkening by the panel 102. In addition, in the case of a plurality of light sources 110, an overlapping of the shadow projections of the plurality of light sources 110 may need to be considered to carry out a correct intensity allocation to the light sources 110.

In a manner similar to the movement prediction in the computation of the position for the darkening of the individual light sources 110, the intensities of the individual light sources 110 can also be tracked. The intensities of the respective light sources or the intensities of the respective darkenings are tracked based on a number of independent parallel control circuits to realize the optimum optical filtering of the external light sources.

The determined intensities of the darkenings are sent to the control unit of the panel 102 (in addition to the position data) to control the degree of darkening of the individual cells 201.

In addition to the cyclic determination of the darkening areas of the panel 102 in the first phase 301 of the method 300, the method 300 also includes further method steps to reduce a glare effect of external light sources 110. In particular, the system 100 should be capable of detecting a glare effect to persons in a room. A method 312 for detecting the glare effect can comprise, in a first step, the determination of the average ambient lighting. Based on the available image information—by evaluation of the full image—the total brightness of the scene as well as the distribution of the light on the image is determined. The brightness of the image typically depends on the exposure time of the image. Consequently, the actual brightness of the scene/environment is obtained as a function of the brightness determined from the image and the exposure time of the image. This function can be determined by empirical measurements. On the other hand, the optical sensor 101 could comprise an auto-exposure function (i.e. an automatic computation of the exposure time), which ensures that by adjusting the exposure time to the actual light conditions, the actual brightness of the scene/environment can be directly determined by evaluation of the image brightness.

In a second step, the brightness in the head area is measured. For this purpose, the image area, which contains the head of the persons, is extracted from the image data to determine the brightness or the distribution of the illumination in this area. The head recognition may be performed, for example, using an adapted version of the Bayes classifiers (i.e. the recognition of the presence of a face, without classification, which person is shown), as described, for example, in "Computer Vision with the OpenCV Library", Gary Bradski, Adrian Kaehler, O'Reilly 2008, ISBN 978-0-596-51613-0. The search for the head of a person and a determination of a head position can be more easily accomplished than an accurate face recognition since a recognition of an outline of the person is sufficient. To cast a shadow on a person, a head recognition or a recognition of an upper body is sufficient. Furthermore, advantageously the entire head or even the entire upper body of the person is darkened. Advantageously, the upper body is identified up to the screen work area and darkened.

As shown in FIG. 4, the detection 312 of a glare effect is cyclic (e.g. in the second phase 311 based on the full image determined in method step 305). Assuming that a person does not move too far in the work area, the head position detected in the preceding cycle can be assumed as a start value in a search in the current full image. Also, motion estimation methods can be used to determine the current position of the head from a series of previous full images, which then can be taken as a start value for recognizing the face.

In the computation of an absolute light brightness in the head area, the actual exposure time of the camera and the brightness of the background elements of the room are usually used in addition to the brightness of the image area.

By examining the relation between the actual brightness of the scene/environment and the brightness of the head area, the glare effect on the persons can be determined. The detection of a glare situation depending on the determined values (brightness of the scene/environment, brightness of the head area) can be ensured by an empirically determined classifier (by means of test persons). The output of said classifier determines whether or not the method 300 to darken the individual cells 201 is activated. Because of the different glare situations in the morning, noon and at night, it is advantageous to determine specific classifiers for daytime operation and for operation at other times. In addition, different classifiers with different degrees of sensitivity can be determined (e.g. activation at low/medium/higher glare effect).

The methods shown in FIG. 4 are executed on the computation unit 104. The computation unit 104 may, for example, be implemented as embedded PC, digital signal processor or FPGA module (field-programmable gate array).

Figure 5:
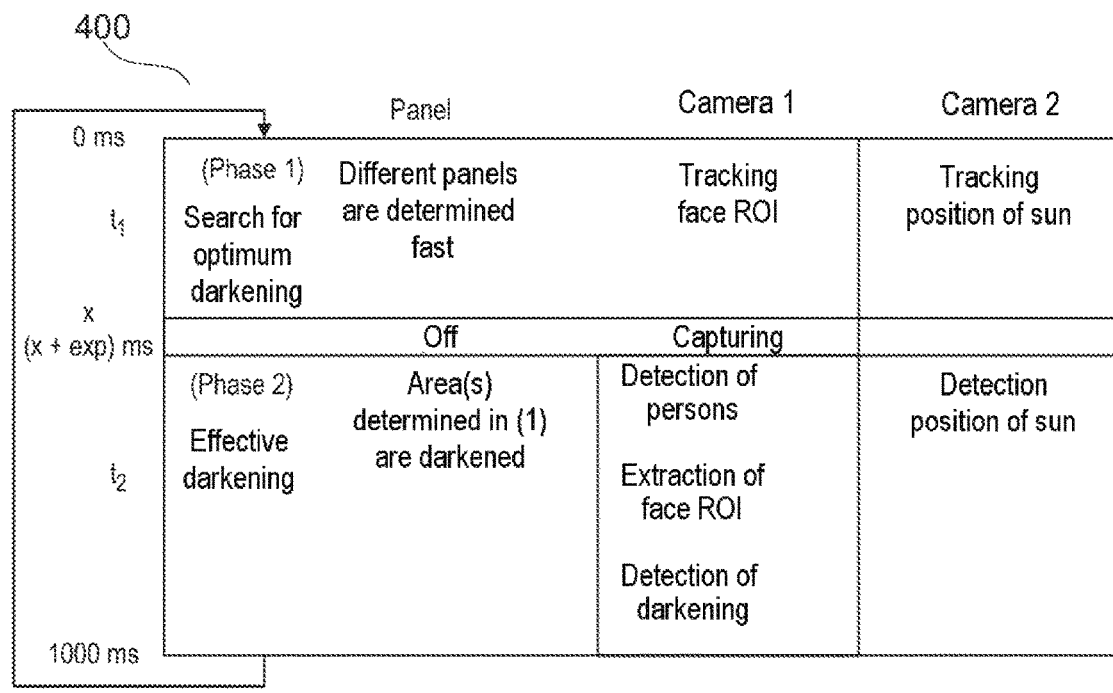
FIG. 5 describes a further exemplary method for avoiding/reducing a glare effect according to an embodiment of the present disclosure.

FIG. 5 shows another exemplary method 300 for reducing the glare effect of external light sources 110 using the device 100. The method is similar to the method 300, so in the following only the differences are described.

In method 400, a further optical sensor is used (see camera 2 in FIG. 5). The "camera 1" in FIG. 5 corresponds to the "camera" in FIG. 4. This further optical sensor captures an image of the at least one light source. The light source can be, for example, the sun or reflections of the sun. This light source can be tracked. Since the light source can be very bright, a camera suitable for this brightness is preferably used or the camera is adjusted for this brightness so that a captured image is not overexposed.

In method 400, the positions of the persons are identified by the computation unit. For this purpose, a camera-related coordinate system can be used, that is, it may be sufficient to recognize the persons in a room in an image of a first optical sensor. Spherical coordinates can be used, that is, only the angles under which a person appears are considered. Said angles can correspond to a number of pixels of the image. Based on reference sizes of humans, a distance of a person can be estimated based on the size of the outline of a person on the image. Alternatively, or additionally, the position of the persons in the room can also be detected absolutely (for example, in Cartesian coordinates, for example with respect to a corner of the room).

Furthermore, in method 400 an image of the light source is captured with a second sensor. The computation unit, which is coupled to the second sensor, identifies the position of the light source based on the image of the second sensor. Here also spherical coordinates can be used, that is, only the angles are considered at which the at least one light source appears. Said angles can correspond to a number of pixels of the image. The distance of the light source can be estimated or assumed as "infinite".

The computation unit derives from the position of the at least one light source and the position of the one or more persons, which of the cells from the plurality of individually dimmable cells need to be darkened, so that a shadow is cast on the one or more persons. Preferably, the computation unit can identify the upper body and/or the heads of the persons and select the cells to be darkened so that the darkened cells cast the shadow on the person's head and/or on the upper body of the person. Further preferably, the computation unit also recognizes individual work devices, such as a computer screen, and selects the cells to be darkened such that the darkened cells also cast the shadow on the work device.

Finally, the computation unit controls the dimmable panel such that a shadow is cast on the one or more persons. All other cells in the panel should remain transparent to maintain contact with the outside area, and the computation unit controls the panel accordingly.

The method 400 can also be repeated, since the position of the persons and the position of the light source can change.

With the help of a detection of the positions of the persons in the room and the position of the at least one light source, the method 400 is accelerated with respect to method 300.

The methods shown in FIG. 5 are executed on the computation unit 104. The computation unit 104 may, for example, be implemented as an embedded PC, digital signal processor or FPGA module (field-programmable gate array).

Aspects of the disclosure include the following:

A device for reducing the glare effect of a light source on persons in office rooms, the device comprising: a dimmable panel comprising a plurality of individually dimmable cells and which is inserted into the building window glass to cast a shadow on persons, an optical sensor which is arranged to detect an image of the persons in a room and their position; a sensor which detects the position of the sun or other glaring source, and a computation unit which is configured to darken one or more cells from the plurality of dimmable cells of the dimmable panel; to optically detect one or more persons using the optical sensor; and to determine based on the image whether a shadow is cast on the person due to the darkened panel.

The above device, wherein the computation unit may be configured to detect one or more shadow cells from the plurality of cells, which cause that a shadow is cast on the person(s) when the one or more shadow cells are darkened when illuminated by the light source.

A method of reducing the glare effect of a light source in the area of the entire office room, including a desk, to persons, the method comprising: darkening an area of the dimmable panel positioned between the persons in an office room; capturing an image of the persons in a room; and determining, based on the image, whether a shadow is cast on the persons in the room due to the darkened panel.

The above method, wherein the dimmable panel may comprise a cell matrix having a plurality of separately dimmable cells; and the darkening of the dimmable panel may include darkening of one or more cells of the plurality of cells.

One of the above methods, optionally further comprising: in a search phase, determining one or more shadow cells of the plurality of cells, by which a shadow is cast from the light source to the persons in a room by their darkening, wherein the determining comprises iterating the steps of darkening, detecting, and determining for different cells of the panel.

One of the above methods, wherein optionally in an iteration a subarea of a plurality of cells of the panel is darkened; the subarea is excluded from determining one or more shadow cells when it is determined that no shadow is cast on the person(s) in the room; and determining one or more shadow cells is restricted to the subarea when it is determined that a shadow is cast on the person(s) in the room.

One of the above methods, optionally comprising, in a darkening phase, darkening the one or more shadow cells to reduce the glare effect of the light source to the persons in the room; and cyclically repeating the search phase and the darkening phase.

One of the above methods, wherein the one or more shadow cells for the specific cycle may be predicted from the one or more shadow cells from the one or more preceding cycles.

One of the above methods, the method optionally comprising: determining an overall image comprising all persons in a room including their environment; wherein the overall image is determined with the panel switched off; and determining an area of the persons in a room; determining a total brightness from the brightness of the overall image; determining a facial brightness from the brightness of the overall image in the area of the persons; and detecting a glare effect on the persons in the room by the light source based on the facial brightness and the overall brightness.

One of the above methods, optionally comprising: determining an area of the persons in a room; wherein the detection of the image of the persons is restricted to the person and the facial area.

This document describes systems and methods for reducing the glare effect of light sources in buildings. The described systems include a selectively dimmable panel and an optical sensor directed to the persons in a room. They can be installed in a building with minimal effort and are practically self-adjusting. By means of iterative feedback methods with synchronized use of the panel and the optical sensor, shadows can be cast on the persons, which darken a plurality of glaring light sources. In this case, only areas on the panel are selectively darkened to not impair the entire viewing area. The iterative methods ensure a continuous tracking of the darkening areas to the movements of the light sources and the movement of the persons in a room.

It should be noted that the description and the figures merely illustrate the principles of the proposed methods and devices. Based on the present disclosure, it is possible for the skilled person to create various variants of the described methods and devices. These variants, although not explicitly described, are also disclosed by this document and are encompassed by the claims.

What is claimed is:

1. A device for reducing a glare effect of a light source in a room of a building, comprising:
    a dimmable panel comprising a plurality of individually dimmable cells attached to a window glass;
    a first optical sensor to detect a first image of one or more objects, wherein the one or more objects include one or more persons in the room of the building and one or more devices associated with the one or more persons, wherein the room is illuminated by a light source through the window glass;
    a second optical sensor to detect a second image of at least one light source; and
    a processor, communicably coupled to the dimmable panel, the first optical sensor and the second optical sensor, to:
        cause the first optical sensor to capture the first image of the one or more object,
        calculate, based on the first image, a respective position of the one or more objects in the room of the building,
        cause the second optical sensor to capture the second image of the light source,
        calculate, based on the second image, a position of the light source, and
        determine and cause to darken, based on the position of the one or more objects and the position of the at least one light source, an area of the plurality of individual dimmable cells, wherein to determine and cause, based on the position of the one or more objects and the position of the light source, the area of the plurality of individual dimmable cells, the processor is further to:
            in a search phase, determine one or more cells of the plurality of separately dimmable cells to be darkened by casting a shadow on the one or more objects in the room from the light source, wherein the determining comprises iterating the steps of darkening, detecting, and determining for different cells of the panel, wherein in one iteration, a subarea of the plurality of separately dimmable cells of the dimmable panel is darkened, and the subarea is excluded from determining the one or more cells of the plurality of dimmable cells to be darken in a subsequent iteration,
            in a darkening phase, darken the one or more cells to reduce the glare effect from the light source to the one or more objects in the room, and
            iteratively repeat the search phase and the darkening phase to determine the one or more cells needed to generate the shadow on the one or more objects.

2. A method for reducing a glare effect of a light source in a room of a building, the method comprising:
    detecting, by a processor, a first image of one or more objects in the room of the building, wherein the first image is captured by a first optical sensor communicably coupled to the processor, and wherein the one or more objects include one or more persons in the room of the building and one or more devices associated with the one or more persons, wherein the room is illuminated by a light source through a window glass attached thereon a dimmable panel comprising a plurality of individually dimmable cells;
    calculating, based on the first image, a respective position of the one or more objects in the room of the building;
    detecting a second image of the light source, wherein the second image is captured by a second optical sensor communicably coupled to the processor;
    calculating, based on the second image, a position of the at least one light source; and
    determining and causing to darken, based on the position of the one or more objects and the position of light source, an area of a dimmable panel arranged between the light source and the one or more objects, wherein determining and causing to darken, based on the position of the one or more objects and the position of the light source, an area of a dimmable panel arranged between the light source and the one or more objects further comprises:
        in a search phase, determining one or more cells of the plurality of separately dimmable cells to be darkened by casting a shadow on the one or more objects in the room from the light source, wherein the determining the one or more cells comprises iterating the steps of darkening, detecting, and determining for different cells of the panel, wherein in one iteration, a subarea of the plurality of separately dimmable cells of the dimmable panel is darkened, and the subarea is excluded from determining the one or more cells of the plurality of dimmable cells to be darken in a subsequent iteration;
        in a darkening phase, darkening the one or more cells to reduce the glare effect from the light source to the one or more objects in the room; and
        iteratively repeating the search phase and the darkening phase to determine the one or more cells needed to generate the shadow on the one or more objects.

3. The method according to claim 2, wherein the one light source is outside of the building, and wherein the light source is one of a sun or a reflection of the sun.

4. The method according to claim 2, wherein the darkening of the area is carried out such that the light source casts the shadow on heads of the one or more persons.

5. The method according to claim 2, wherein the dimmable panel comprises a liquid crystal display (LCD) film which is one of applied to the window glass or incorporated between two layers within the window glass.

6. The method according to claim 2, wherein the one or more cells for the current iteration are predicted from the one or more cells of one or more preceding iterations.

7. The method according to claim 6, further comprising:
    determining an overall image, which includes all persons in the room including their surroundings, wherein the overall image is determined with the panel shut off;
    determining an area of one or more persons in the room;

determining an overall brightness level from the brightness of the overall image;

determining a facial brightness level from the brightness level of the overall image in the area of the one or more persons; and detecting a glare effect on the one or more persons in the room by the light source based on the facial brightness level and overall brightness.

8. The device according to claim 1, wherein the first optical sensor is positioned to capture an image of the entire room.

* * * * *